United States Patent
Angelo et al.

(10) Patent No.: US 7,073,064 B1
(45) Date of Patent: Jul. 4, 2006

(54) METHOD AND APPARATUS TO PROVIDE ENHANCED COMPUTER PROTECTION

(75) Inventors: Michael F. Angelo, Houston, TX (US); George David Wisecup, Houston, TX (US); David L. Collins, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/540,697

(22) Filed: Mar. 31, 2000

(51) Int. Cl.
*H04L 9/00* (2006.01)
(52) U.S. Cl. .......................... 713/176; 710/10; 711/170
(58) Field of Classification Search ................ 713/176, 713/2, 1, 100, 168, 170, 171, 182, 187, 189, 713/191, 200, 201; 714/8, 6; 710/10; 711/162, 711/170
See application file for complete search history.

(56) References Cited

U.S. PATENT DOCUMENTS

| | | | |
|---|---|---|---|
| 5,748,888 A | 5/1998 | Angelo et al. | |
| 5,748,940 A | 5/1998 | Angelo et al. | |
| 5,778,070 A * | 7/1998 | Mattison | 713/191 |
| 5,844,986 A * | 12/1998 | Davis | 713/187 |
| 5,848,418 A | 12/1998 | de Souza et al. | 707/102 |
| 5,859,911 A | 1/1999 | Angelo et al. | 380/25 |
| 5,887,131 A | 3/1999 | Angelo | |
| 5,892,906 A | 4/1999 | Chou et al. | |
| 5,923,754 A | 7/1999 | Angelo et al. | 380/4 |
| 5,944,821 A | 8/1999 | Angelo | 713/200 |
| 5,953,422 A | 9/1999 | Angelo et al. | 380/23 |
| 5,960,084 A | 9/1999 | Angelo | 380/25 |
| 5,974,250 A | 10/1999 | Angelo et al. | |
| 6,003,144 A | 12/1999 | Olarig et al. | 714/42 |
| 6,009,524 A | 12/1999 | Olarig et al. | 713/200 |
| 6,026,016 A * | 2/2000 | Gafken | 365/185.04 |
| 6,131,174 A | 10/2000 | Fischer et al. | |
| 6,134,591 A | 10/2000 | Nickles | |
| 6,178,167 B1 | 1/2001 | Fraser | |
| 6,205,548 B1 * | 3/2001 | Hasbun | 713/2 |
| 6,263,431 B1 | 7/2001 | Lovelance et al. | |
| 6,308,265 B1 * | 10/2001 | Miller | 713/2 |
| 6,311,273 B1 | 10/2001 | Helbig et al. | |
| 6,401,208 B1 * | 6/2002 | Davis et al. | 713/193 |
| 6,477,648 B1 | 11/2002 | Schell et al. | |
| 6,510,521 B1 * | 1/2003 | Albrecht et al. | 713/193 |

* cited by examiner

*Primary Examiner*—Kim Vu
*Assistant Examiner*—T. B. Truong

(57) ABSTRACT

A method and apparatus for protecting a computer system. Specifically, a method and system for validating portions of memory at each power-on cycle is described. A Boot Block is used to validate the BIOS, CMOS and NVRAM of a system. The BIOS may also be used to validate the Boot Block, CMOS and NVRAM.

55 Claims, 10 Drawing Sheets

| SYMBOL | DESCRIPTION |
|---|---|
| $K_{PUB}$ | PUBLIC KEY |
| $B_H$ | BIOS HASH |
| $B_{SIG}$ | BIOS SIGNATURE( BIOS ENCRYPTED HASH) |
| $B_{DSIG}$ | BIOS SIGNATURE DECRYPTED |
| $B_{H1}$ | BIOS HASH THAT SHOULD BE PRESENT |
| $B_{H2}$ | BIOS HASH THAT IS PRESENT |
| BB | BOOT BLOCK |
| $BB_H$ | BOOT BLOCK HASH |
| $BB_{SIG}$ | BOOT BLOCK SIGNATURE (BOOT BLOCK ENCRYPTED HASH) |
| $BB_{DSIG}$ | BOOT BLOCK SIGNATURE DECRYPTED |
| $BB_{H1}$ | BOOT BLOCK HASH THAT SHOULD BE PRESENT |
| $BB_{H2}$ | BOOT BLOCK HASH THAT IS PRESENT |
| $CMOS_H$ | CMOS HASH |
| $CMOS_{SIG}$ | CMOS SIGNATURE (CMOS ENCRYPTED HASH) |
| $CMOS_{DSIG}$ | CMOS SIGNATURE DECRYPTED |
| $CMOS_{H1}$ | CMOS HASH THAT SHOULD BE PRESENT |
| $CMOS_{H2}$ | CMOS HASH THAT IS PRESENT |
| $NVRAM_H$ | NVRAM HASH |
| $NVRAM_{SIG}$ | NVRAM SIGNATURE (NVRAM ENCRYPTED HASH) |
| $NVRAM_{DSIG}$ | NVRAM SIGNATURE DECRYPTED |
| $NVRAM_{H1}$ | NVRAM HASH THAT SHOULD BE PRESENT |
| $NVRAM_{H2}$ | NVRAM HASH THAT IS PRESENT |

FIG. 7

METHOD AND APPARATUS TO PROVIDE ENHANCED COMPUTER PROTECTION

BACKGROUND OF THE INVENTION

1. Field of the Invention

The present invention relates generally to protecting a computer system and, more particularly, to protecting at least one of a BIOS, Boot Block, CMOS, and NVRAM in a computer system.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer security is becoming increasingly important in today's environment of heavily networked computer systems. As a result, security and integrity features are becoming desirable in the use of personal computers and servers. Of particular concern is the protection of reprogrammable start up memory from unauthorized reprogramming or alteration of the computer's non-volatile memory.

When a computer is initially turned on, the computer executes a series of instructions from a specified startup routine. The startup routine is generally referred to as the Basic Input/Output System (BIOS). The memory in which the BIOS is stored is typically small. It stores the basic software to provide for initial set up and configuration of the system and allows the system to load and execute subsequent programs. Since the configuration software must be available at startup time, the BIOS is typically stored in non-volatile memory.

In the past, the BIOS was generally stored in a read only memory device. However, it has become more common in recent years to store the BIOS routine in a reprogrammable or random access memory so that the BIOS software can be upgraded when necessary. Thus, typically the BIOS is stored in FLASH memory or a non-volatile Random Access Memory (NVRAM) to allow the contents of the BIOS to be changed. The act of changing the contents of non-volatile memory is often called "flashing" the memory.

A flashable BIOS may consist of two separately programmable portions, each containing identical copies of the BIOS software. To upgrade or flash the BIOS, only half of the memory is updated at one time. To update the BIOS without losing operability, the inactive half of the BIOS is overwritten first. Once the system is power cycled the second time, the system is brought up with the newly overwritten portion of the BIOS being active. Subsequently, the section containing the older BIOS routine can be updated while it is inactive. While this method of flashing the BIOS offers obvious advantages over the conventional method of upgrading the BIOS by physically replacing a memory chip, this ability to alter the BIOS creates various security risks. To prevent malicious, as well as inadvertent, reprogramming of the BIOS, various security measures are often implemented into computer systems.

The present invention may be directed to addressing one or more of the problems set forth above.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment of the present invention, there is provided a method and apparatus for validating segments of memory in a computer system. Specifically, a Boot-Block is used to validate a BIOS and the BIOS is used to validate the Boot-Block. These validation algorithms can be implemented in conjunction with a cryptographic algorithm to provide enhanced system protection. Also, the Boot-Block and/or the BIOS may be used to validate other memory segments such as the CMOS or additional portions of the NVRAM.

In another embodiment of the present invention, there is provided a method and apparatus in which a Boot-Block may be used to validate the BIOS. This validation algorithm can be implemented in conjunction with a cryptographic algorithm to provide enhanced system protection. Also, the Boot-Block may be used to validate other memory segments such as the CMOS or additional portions of the NVRAM.

In yet another embodiment of the present invention, there is provided a method and apparatus in which the BIOS may be used to validate a Boot Block. This validation algorithm can be implemented in conjunction with a cryptographic algorithm to provide enhanced system protection. Also, the BIOS may be used to validate other memory segments such as the CMOS or additional portions of the NVRAM.

DESCRIPTION OF THE DRAWINGS

The foregoing and other advantages of the invention will become apparent upon reading the following detailed description and upon reference to the drawings in which:

FIG. 7 illustrates a table of symbols used in FIGS. 4–6.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
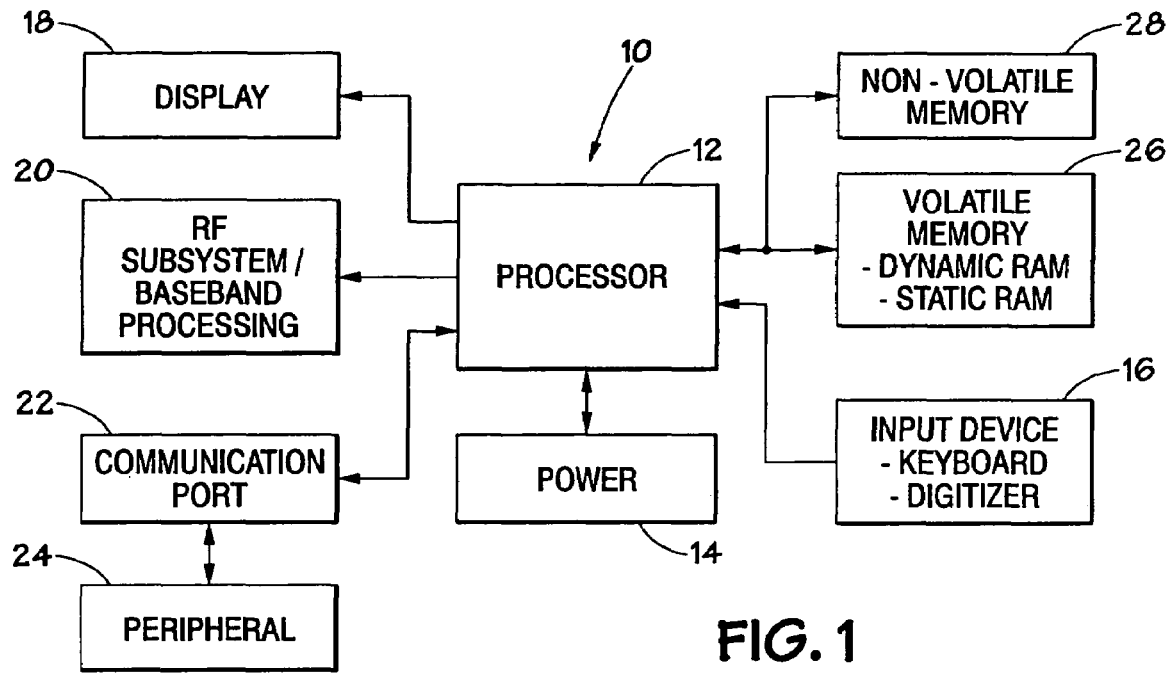
FIG. 1 illustrates a block diagram of an exemplary processor-based device in accordance with the present invention.

Turning now to the drawings, and referring initially to FIG. 1, a block diagram depicting an exemplary processor-based device, generally designated by the reference numeral 10, is illustrated. The device 10 may be any of a variety of different types, such as a computer, pager, cellular telephone, personal organizer, control circuit, etc. In a typical processor-based device, a processor 12, such as a microprocessor, controls many of the functions of the device 10.

The device 10 typically includes a power supply 14. For instance, if the device 10 is portable, the power supply 14 would advantageously include permanent batteries, replaceable batteries, and/or rechargeable batteries. The power supply 14 may also include an A/C adapter, so that the device may be plugged into a wall outlet, for instance. In fact, the power supply 14 may also include a D/C adapter, so that the device 10 may be plugged into a vehicle's cigarette lighter, for instance.

Various other devices may be coupled to the processor 12, depending upon the functions that the device 10 performs. For instance, a user interface 16 may be coupled to the processor 12. The user interface 16 may include buttons, switches, a keyboard, a light pin, a mouse, and/or a voice recognition system, for instance. A display 18 may also be coupled to the processor 12. The display 18 may include an LCD display, a CRT, LEDs, and/or an audio display. Furthermore, an RF subsystem/baseband processor 20 may also be coupled to the processor 12. The RF subsystem/baseband processor 20 may include an antenna that is coupled to an RF receiver and to an RF transmitter (not shown). A communications port 22 may also be coupled to the processor 12. The communications port 22 may be adapted to be coupled to a peripheral device 24, such as a modem, a printer, or a computer, for instance, or to a network, such as a local area network, an intranet and/or the Internet.

Because the processor 12 controls the functioning of the device 10 generally under the control of software programming, memory is coupled to the processor 12 to store and facilitate execution of the program. For instance, the processor 12 may be coupled to volatile memory 26, which may include dynamic random access memory (DRAM) and/or static random access memory (SRAM). The processor 12 may also be coupled to non-volatile memory 28. The non-volatile memory 28 may include a read only memory (ROM), such as an EPROM, and/or Flash memory, to be used in conjunction with the volatile memory. The size of the ROM is typically selected to be just large enough to store any necessary BIOS operating system, application programs, and fixed data. The volatile memory, on the other hand, is typically quite large so that it can store dynamically loaded applications. Additionally, the non-volatile memory 28 may include a high capacity memory such as a disk or tape drive memory.

Figure 2:
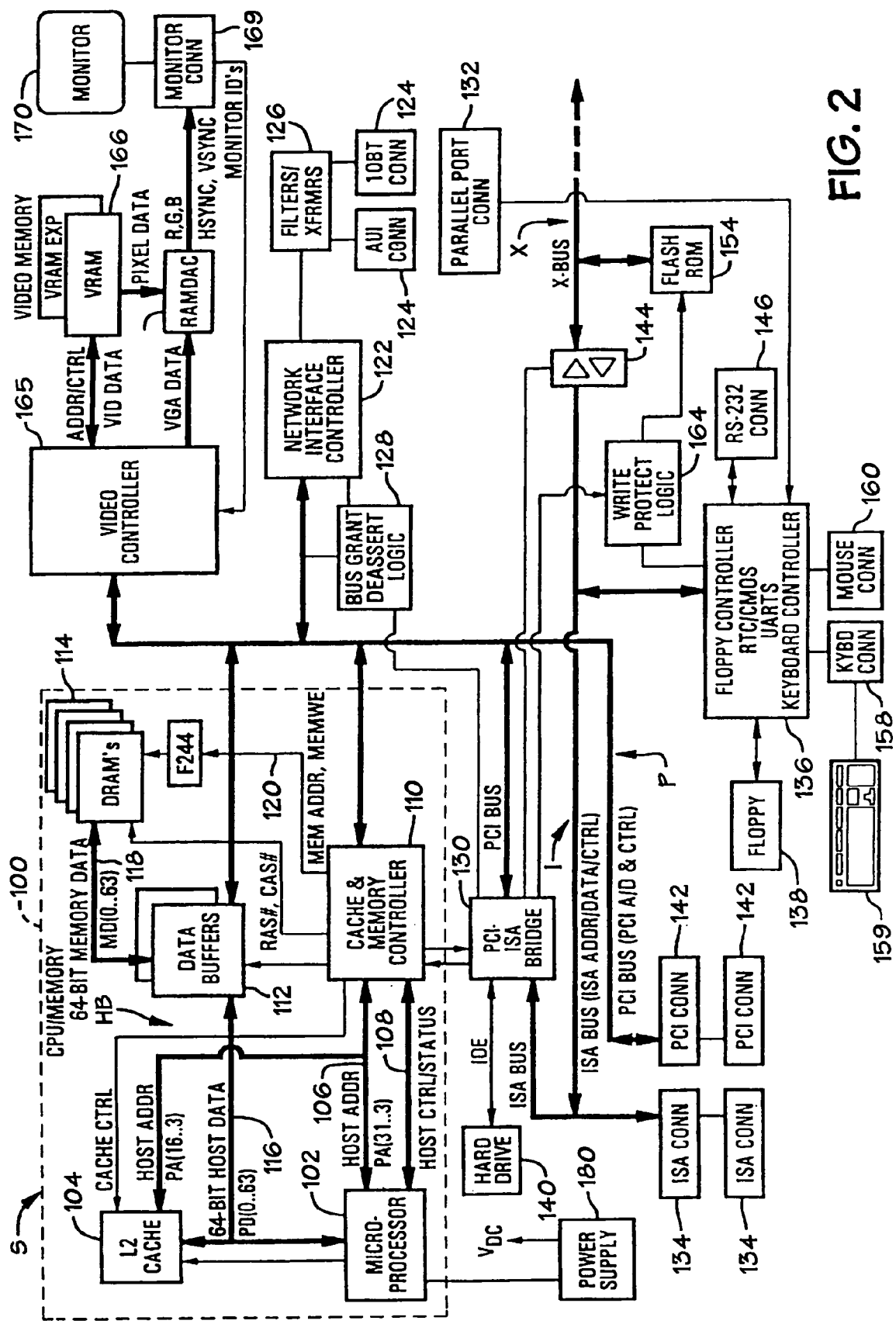
FIG. 2 illustrates a block diagram of a computer system according to the present invention.

Referring to FIG. 2, a computer system S, according to the present invention is illustrated. In one embodiment, the system S incorporates two primary buses, a Peripheral Component Interconnect (PCI) bus P which includes an address/data portion and an Industry Standard Architecture (ISA) bus I which includes an address portion, a data portion, and a control signal portion. The PCI and ISA buses P and I form the architectural backbone of the computer system S.

A CPU/memory subsystem 100 is connected to the PCI bus P. The processor 102 may be a Mercid or Pentium® processor from Intel Corporation, but could be an 80486 or any number of similar processors from other manufacturers. The processor 102 drives data, address, and control portions 116, 106, and 108 of a host bus HB. A level 2 (L2) or external cache memory 104 may be connected to the host bus HB to provide additional caching capabilities that improve the overall performance of the computer system S. The L2 cache 104 may be permanently installed or may be removable if desired. A cache and memory controller 110 and a PCI-ISA bridge chip 130 are connected to the control and address portions 108 and 106 of the host bus HB. The cache and memory controller chip 110 is configured to control a series of data buffers 112. The data buffers 112 may be 82433LX from Intel, for example, and develop the host data bust 116 and a MD or memory data bus 118 that is connected to a memory array 114. A memory address and memory control signal bus is provided from the cache and memory controller 110.

The data buffers 112, cache and memory controller 110, and PCI-ISA bridge 130 are all connected to the PCI bus P. The PCI-ISA bridge 130 is used to convert signals between the PCI bus P and the ISA bus I. The PCI-ISA bridge 130 may include, for instance, address and data buffers, arbitration and bus master control logic for the PCI bus P, ISA arbitration circuitry, an ISA bus controller as conventionally used in ISA systems, an IDE (intelligent drive electronics) interface, and a DMA controller. A hard disk drive 140 is connected to the IDE interface of the PCI-ISA bridge 130. Tape drives, CD-ROM devices, or other peripheral storage devices (not shown) could be similarly connected.

The PCI-ISA bridge 130 may also include miscellaneous system logic. This miscellaneous system logic may contain counters and timers as conventionally present in personal computer systems, an interrupt controller for both the PCI and ISA buses P and I, and power management logic. Additionally, the miscellaneous system logic may include circuitry for a security management system used for password verification and to allow access to protected resources.

The PCI-ISA bridge 130 may also include circuitry to generate a "soft" SMI (System Management Interrupt), as well as SMI and keyboard controller interface circuitry. The miscellaneous system logic is connected to the flash ROM 154 through write protection logic 164. Advantageously, the PCI-ISA bridge 130 is a single integrated circuit, but other combinations are possible. A series of ISA slots 134 may be connected to the ISA bus I to receive ISA adapter cards. Also, a series of PCI slots 142 may be similarly provided on the PCI bus P to receive PCI adapter cards.

A video controller 165 may be connected to the PCI bus P. Video memory 166 is used to store graphics data and is connected to the video graphics controller and a digital/analog converter (RAMDAC) 168. The video graphics controller 165 controls the operation of the video memory 166, allowing data to be written and retrieved as required. A monitor connector 169 is connected to the RAMDAC 168 for connecting a monitor 170.

A network device, such as network interface controller (NIC) 122 is also connected to the PCI bus P. Advantageously, the controller 122 is a single integrated circuit that includes the capabilities necessary to act as a PCI bus master slave, as well as circuitry required to act as an Ethernet interface. Attachment Unit Interface (AUI) and 10 base-T connectors 124 are provided in the system S, and are connected to the NIC 122 via filter and transformer circuitry 126. This circuitry forms a network or Ethernet connection for connecting the computer system S to a local area network (LAN).

A combination I/O chip 136 may be connected to the ISA bus I. The combination I/O chip 136 may include a real-time clock, two UARTS, a floppy disk controller for controlling a floppy disk drive 138, and various address decode logic and security logic to control access to the CMOS memory (shown in FIG. 3) and power-on password values. A control line may be provided to the read and write protection logic 164 to further control access to the flash ROM 154. Serial port connectors 146 and parallel port connector 132 also may be connected to the combination I/O chip 136. An 8042 or keyboard controller also may be included in the combination I/O chip 136. The keyboard controller is of conventional design and is connected in turn to a keyboard connector 158 and a mouse or pointing device connector 160. A keyboard 159 is connected to the computer system S through the keyboard connector 158.

Figure 3:
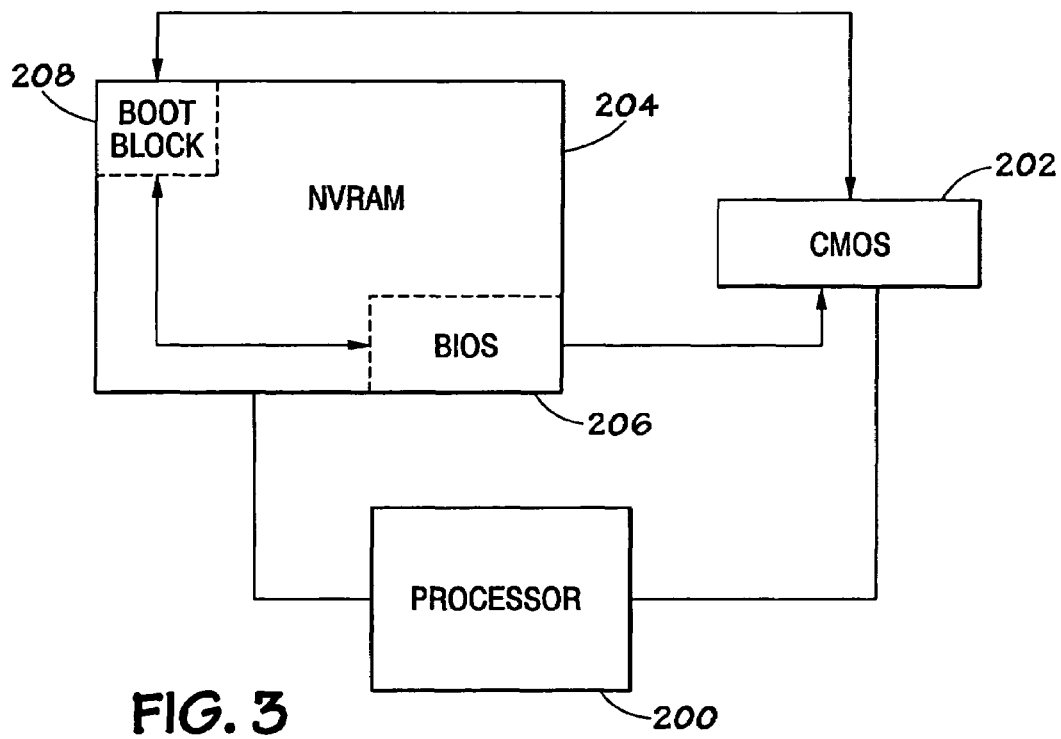
FIG. 3 illustrates a block diagram of a processor-based system with a processor operatively coupled to various memory devices.

A buffer 144 may be connected to the ISA bus I to provide an additional X-bus X for various additional components of the computer system S. A flash ROM 154 receives its control, address, and data signals form the X-bus X. The flash ROM 154 may contain the BIOS information for the computer system and can be reprogrammed to allow for revisions of the BIOS. However, the BIOS routine may be stored in non-volatile random access memory (NVRAM) as illustrated in FIG. 3.

As previously discussed it is often desirable to protect computer systems. Providing "security" for a system involves providing protection from a variety of possible attacks. For instance, providing security may include protecting a system from viruses. Further, it may include protecting the system from hackers. It may also include preventing any change in operating system passwords. For a specific company with particular internal systems, it may include authentication of attached machines and prevention of rogue or external devices, which may be foreign to the internal system, from accessing the internal machines.

One approach to security involves "cryptography." Cryptography is typically used to protect both data and communications. Encryption is typically accomplished through the use of a cryptographic algorithm, which is essentially a mathematical function. The most common cryptographic algorithms are key-based, where special knowledge of various information called a "key" is required to decrypt the encrypted message.

One common type of cryptographic algorithm is an asymmetric or "public key" algorithm. In public key cryptosystems, each user has two related complimentary keys, a publicly revealed key and a private key. Each key unlocks the code that the other key makes. Knowing the public key provides no corresponding information regarding the private key. A public key may be stored in a memory to provide wide access to the public key, but the public key is only useful to decrypt data which has been encrypted with a corresponding private key.

Digital "signatures" are used to provide message authentication. The sender uses his own private key to encrypt a hash thereby "signing" the message. The encryption process creates a unique signature which allows for easy detection of any changes in the message. The recipient can verify the digital signature by using the sender's public key to decrypt it. This proves that the sender is the true originator of the message and that the message has not been subsequently altered by anyone else since the sender possesses the private key that produced that digital signature.

Encryption and the use of digital signatures can be combined to provide both privacy and authentication by first signing a message with the sender's private key then encrypting the signed message with the recipient's public key. The recipient reverses the steps by first decrypting the message with his own private key, and then checking the enclosed digital signature with the sender's public key. In this way, the encrypted message cannot be read by anyone but the recipient, and it can only have been created by the sender.

This type of cryptographic algorithm may be implemented in a flash memory system to ensure that the current flashable BIOS is authorized and uncorrupted. A digital signature corresponding to the BIOS (or any memory component being verified) is stored for comparison to the actual current BIOS hash. If the decrypted digital signature matches the current BIOS hash at the time the system is powered on, the BIOS is validated and the system can continue to boot. This method can be useful to validate other portions of memory, such as the Boot Block, CMOS, and NVRAM, as described below.

Flashable or reprogrammable components are protected using digital signature technology as discussed above. Specifically, the BIOS may contain a protected segment which is generally not flashable or reprogrammable. This segment or "Boot Block" may be used to validate the integrity of the BIOS, CMOS and/or NVRAM. However, if the Boot Block is somehow corrupted the security system may fail. Further, this security measure may be circumvented if the flash memory can be replaced or removed. It is important to verify various start-up and memory components each time the system is powered-on to ensure that the components have not been corrupted.

FIG. 3 illustrates a simplified block diagram of a general processor-based system with a processor operatively coupled to various memory devices. Referring briefly to FIG. 1, recall that the processor 12 may be coupled to both volatile memory 26 and non-volatile memory 28. The processor 200 in FIG. 3 is likewise coupled to a segment of non-volatile memory and a segment of volatile memory. Specifically, the processor 200 is coupled to a CMOS device 202 which may be a volatile RAM device. The processor 200 is also coupled to a non-volatile RAM device (NVRAM) 204. As previously discussed, the BIOS 206 may be in a flashable or reprogrammable segment in the NVRAM 204. Alternatively, the BIOS 206 may be a separate flashable or reprogrammable chip.

Also illustrated in FIG. 3 is a Boot Block 208. According to one aspect of the present invention, the Boot Block is generally used to validate the BIOS 206. Each time the system is powered-on, the Boot Block 208 verifies that the BIOS 206 is a valid BIOS. The BIOS 206 may also be used to validate the Boot Block 208. Likewise, the Boot Block 208 and/or the BIOS 206 can be used to validate other segments of the NVRAM 204 or the CMOS 202, as will be discussed with reference to FIGS. 4 through 7 below.

Figure 4A:
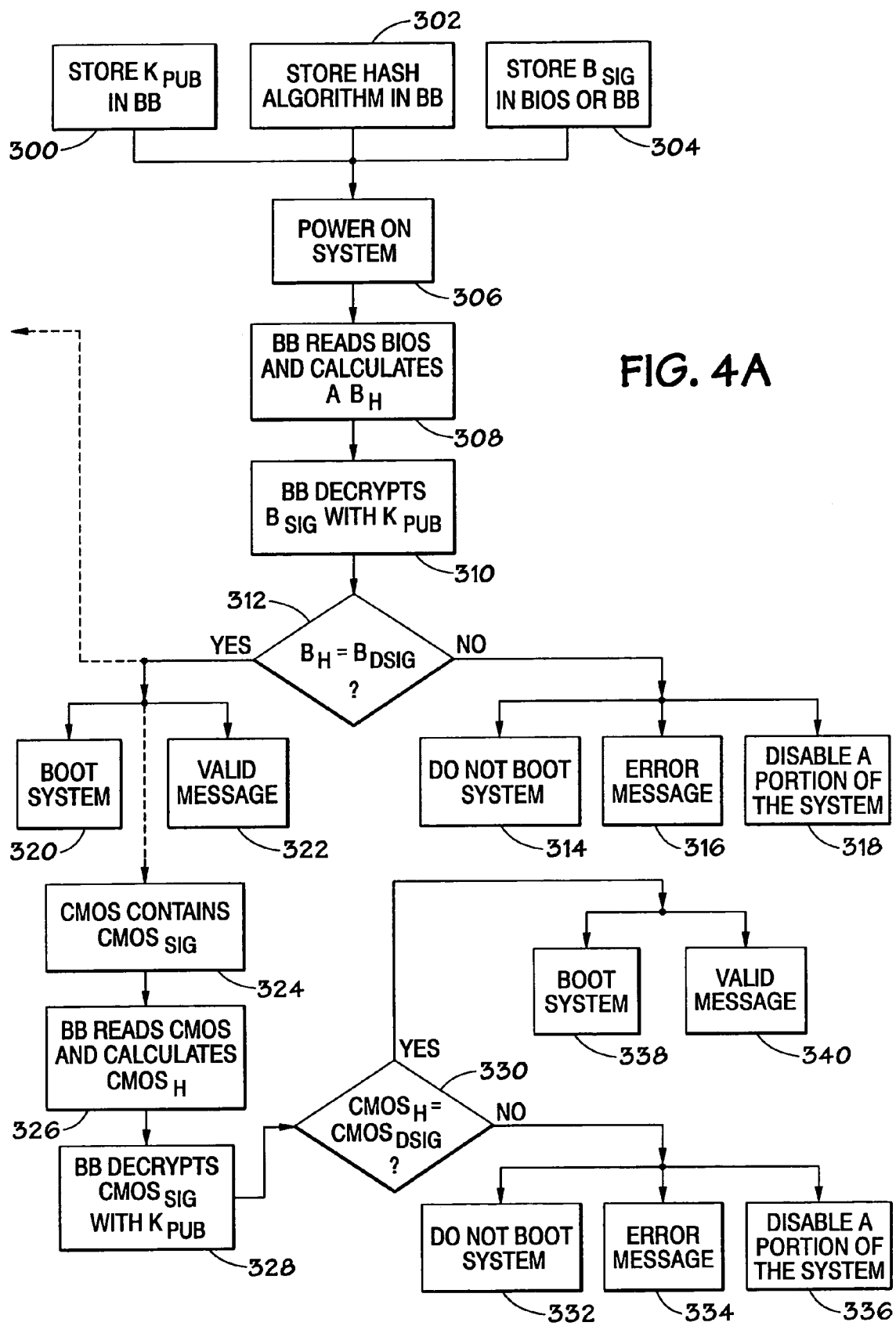
FIG. 4 illustrates a flow chart wherein a Boot Block is used to validate a BIOS using an encryption algorithm, such as a private key/public key algorithm, in accordance with the present invention.
Figure 4B:
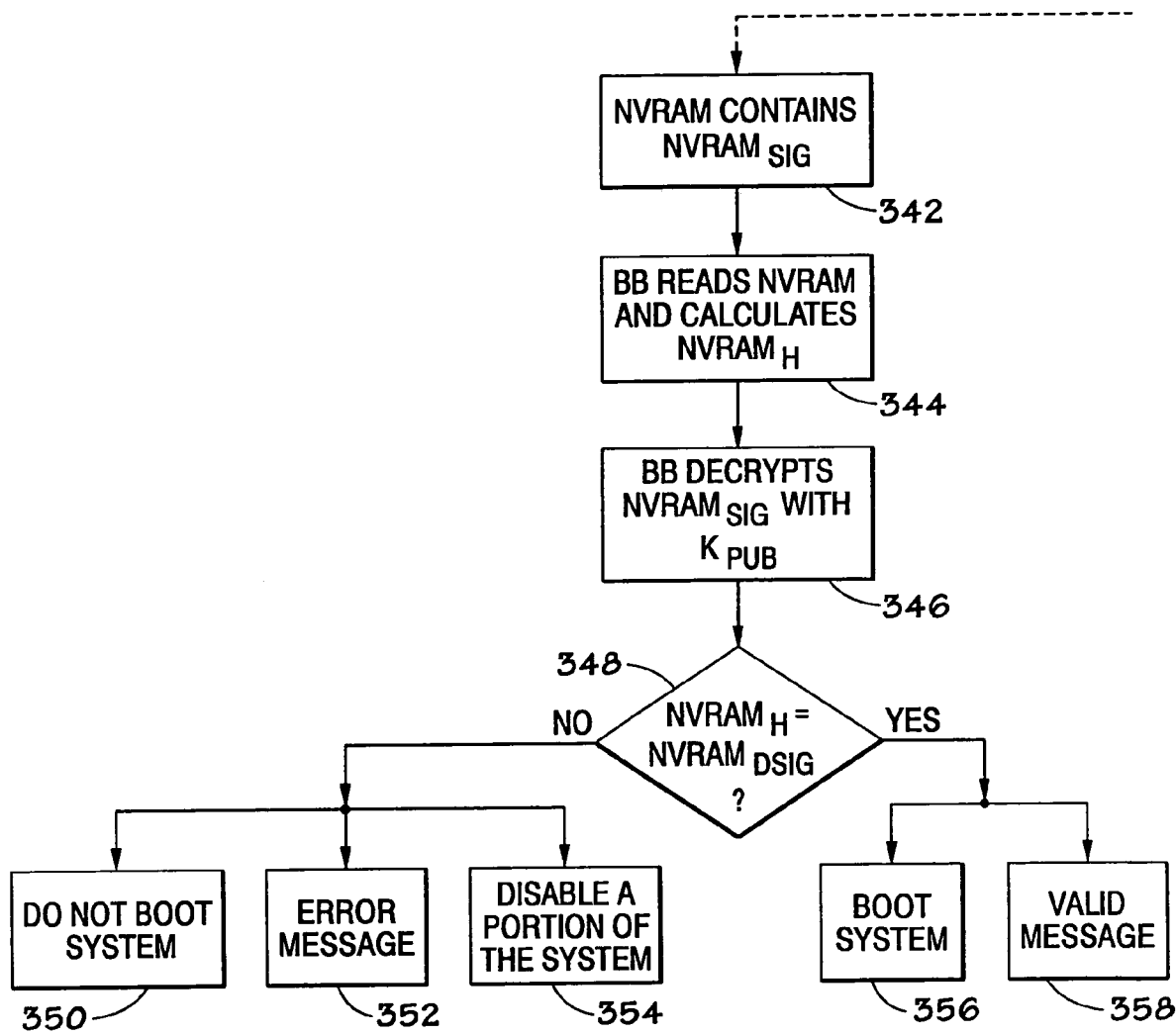

FIG. 4 illustrates a flow chart describing one embodiment wherein the Boot Block 208 is used to validate the BIOS 206. FIG. 7 illustrates a table of symbols used in FIGS. 4–6 and should be used in conjunction with the discussion of those figures. For clarity, the reference numerals have been omitted when referring to the Boot Block 208, the BIOS 206, the NVRAM 204, and the CMOS 202. However, it should be clear that discussion of the various components correlates with a system as illustrated in FIG. 3. Initially, a Public Key ($K_{PUB}$) is stored in the Boot Block (block 300). A hash algorithm is also stored in the Boot Block (block 302). The hash algorithm is generally used to provide a fixed length hash value which represents a fingerprint indicating the source of a message. Therefore, a BIOS hash ($B_H$) will illustrate a fingerprint identifying the BIOS. A BIOS signature ($B_{SIG}$) is also stored in the BB or the BIOS (block 304). $B_{SIG}$ represents an encrypted BIOS hash value, indicating a valid BIOS fingerprint. Thus, $B_{SIG}$ represents what the BIOS hash value should be, while $B_H$ represents the actual current BIOS hash value.

Each time the system is powered-on (block 306), the validation routine is implemented. First, the Boot Block reads the BIOS and calculates the current BIOS hash value (block 308). Next, the Boot Block uses the Public Key to decrypt the BIOS signature block 310). If the BIOS is valid, the BIOS hash value ($B_H$) should equal the decrypted BIOS signature value ($B_{DSIG}$). The values may be compared using a "checksum" algorithm or Cyclic Redundancy Check (CRC) to detect any differences. Thus, a comparison between $B_H$ and $B_{DSIG}$ is made (block 312).

If the values do not match, this indicates that the current BIOS is invalid. That is, the current BIOS has either been corrupted or illegally overwritten. If the BIOS is not valid, the system may be configured to take one or more actions, such as preventing the system from booting (block 314), producing an error message to a user indicating that the BIOS is not valid and/or requesting user input (block 316), and/or disabling a portion of the system (block 318), for example. Disabling a portion of the system block 318 may include disabling disk drives or communication cards, or it may prevent the user from connecting to a network, for example. If, on the other hand, the BIOS hash ($B_H$) and the decrypted BIOS signature ($B_{DSIG}$) match, the BIOS is valid. If the BIOS is valid, the system may be configured to take one or more actions. For instance, the system may be configured such that the system automatically boots (block 320) if the BIOS is valid, or a message may appear indicating that the BIOS is valid (block 322) and prompting the user to take action to continue with the booting process.

Further, the Boot Block may be used to validate other portions of memory, such as the CMOS or additional areas in the NVRAM. To validate the CMOS, a CMOS signature ($CMOS_{SIG}$) representing the encrypted CMOS hash may be stored within the Boot Block or CMOS, indicating a valid CMOS fingerprint (block 324). Next, the Boot Block reads the CMOS and calculates a CMOS hash ($CMOS_H$) using the hash algorithm which is stored in the Boot Block (block 302), as indicated by block 326. The Boot Block then uses the Public Key ($K_{PUB}$) stored in the Boot Block (block 300) to decrypt the CMOS signature (block 328). The values of the CMOS hash ($CMOS_H$) and the decrypted CMOS signature ($CMOS_{DSIG}$) may then be compared by using a checksum or CRC program (block 330), for example. If the values do not match, this indicates that the current CMOS is invalid. If the CMOS is not valid, the system may be configured to take one or more actions, such as preventing the system from booting (block 332), producing an error message to a user indicating that the CMOS is not valid and/or requesting user input (block 334), and/or disabling a portion of the system (block 336), for example. If, on the other hand, the CMOS hash ($CMOS_H$) and the decrypted CMOS signature ($CMOS_{DSIG}$) match, the CMOS is valid. If the CMOS is valid, the system may be configured to take one or more actions. For instance, the system may be configured such that the system automatically boots (block 338) if the CMOS is valid, or a message may appear indicating that the CMOS is valid (block 340) and prompting the user to take action to continue with the booting process.

To validate the NVRAM, a NVRAM signature ($NVRAM_{SIG}$) representing the encrypted NVRAM hash may be stored within the Boot Block or NVRAM, indicating a valid NVRAM fingerprint (block 342). Next, the Boot Block reads the NVRAM and calculates a NVRAM hash ($NVRAM_H$) using the hash algorithm which is stored in the Boot Block (block 302), as indicated by block 344. The Boot Block then uses the Public Key ($K_{PUB}$) stored in the Boot Block (block 300) to decrypt the NVRAM signature (block 346). The values of the NVRAM hash ($NVRAM_H$) and the decrypted NVRAM signature ($NVRAM_{DSIG}$) may then be compared by using a checksum or CRC program (block 348), for example. If the values do not match, this indicates that the current NVRAM is invalid. If the NVRAM is not valid, the system may be configured to take one or more actions, such as preventing the system from booting (block 350), producing an error message to a user indicating that the NVRAM is not valid (block 352), and/or disabling a portion of the system (block 354), for example. If, on the other hand, the NVRAM hash ($NVRAM_H$) and the decrypted NVRAM signature ($NVRAM_{DSIG}$) match, the NVRAM is valid. If the NVRAM is valid, the system may be configured to take one or more actions. For instance, the system may be configured such that the system automatically boots (block 356) if the NVRAM is valid, or a message may appear indicating that the NVRAM is valid (block 358) and prompting the user to take action to continue with the booting process.

Figure 5A:
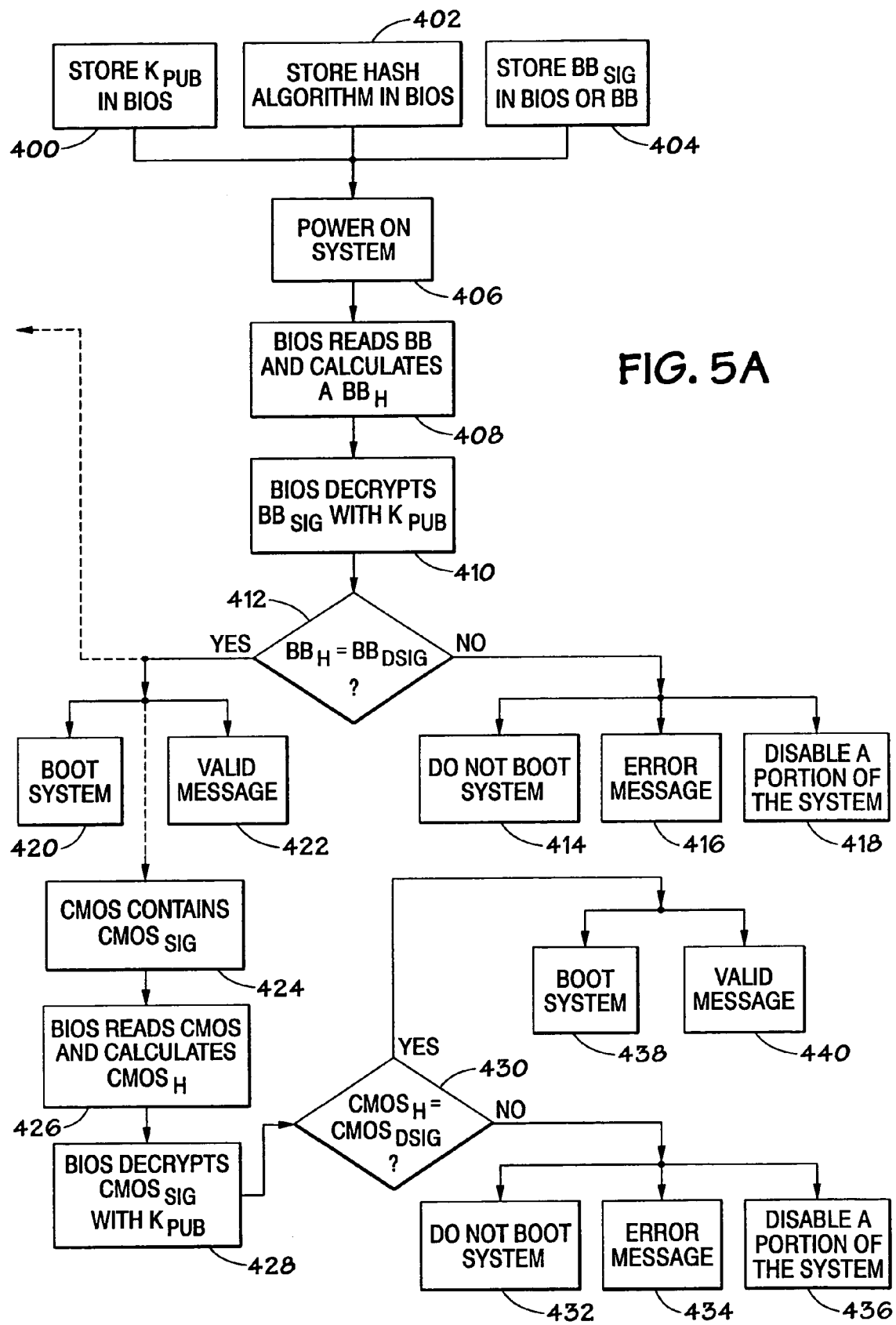
FIG. 5 illustrates a flow chart wherein a BIOS is used to validate a Boot Block, possibly using an encryption algorithm, such as a private key/public key algorithm, in accordance with the present invention.
Figure 5B:
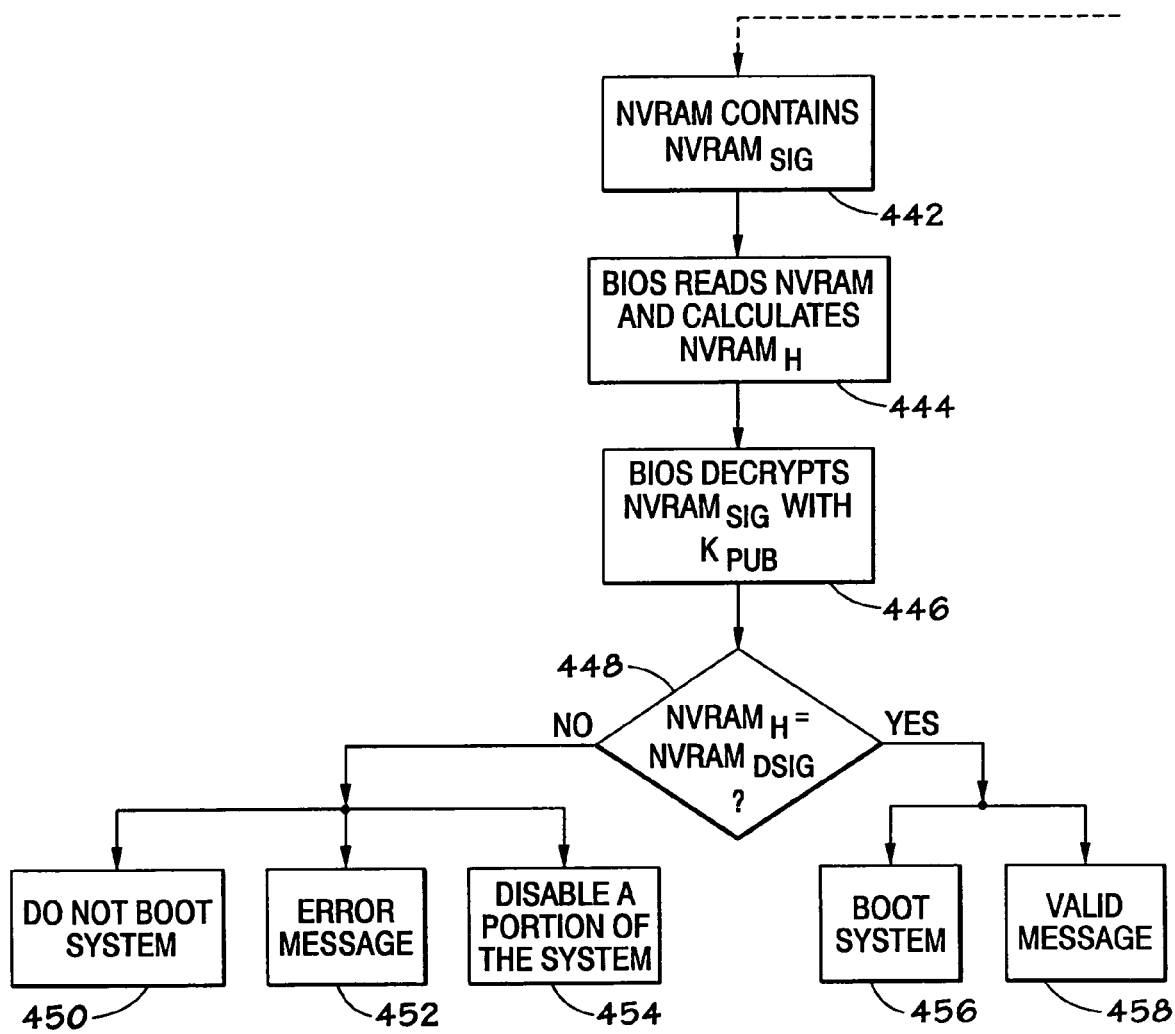

FIG. 5 illustrates a flow chart describing another embodiment wherein the BIOS is used to validate the Boot Block. Initially, a Public Key ($K_{PUB}$) is stored in the BIOS (block 400). A hash algorithm is also stored in the BIOS (block 402). Here, a Boot Block hash ($BB_H$) represents the current Boot Block hash value. A Boot Block signature ($BB_{SIG}$) is stored in the BB or the BIOS (block 404). $BB_{SIG}$ represents an encrypted Boot Block hash value, indicating a valid Boot Block fingerprint. Thus, $BB_{SIG}$ represents what the Boot Block hash value should be, while $BB_H$ represents the actual current Boot Block hash value.

Each time the system is powered on (block 406), the validation routine is implemented. First, the BIOS reads the Boot Block and calculates the current Boot Block hash value (block 408). Next, the BIOS uses the Public Key to decrypt the Boot Block signature (block 410). If the Boot Block is valid, the Boot Block hash value ($BB_H$) will equal the decrypted Boot Block signature value ($BB_{DSIG}$). The values may be compared using a checksum algorithm or Cyclic Redundancy Check (CRC), for example, to detect any differences. Thus, a comparison between $B_H$ and $B_{DSIG}$ is made (block 412). If the values do not match, this indicates that the current Boot Block is invalid. If the Boot Block is not valid, the system may be configured to take one or more actions, such as preventing the system from booting (block 414), producing an error message to a user indicating that the Boot Block is not valid (block 416), and/or disabling a portion of the system (block 418), for example. If, on the other hand, the Boot Block hash ($BB_H$) and the decrypted Boot Block signature ($BB_{DSIG}$) match, the Boot Block is valid. If the Boot Block is valid, the system may be configured to take one or more actions. For instance, the system may be configured such that the system automatically boots (block 420) if the Boot Block is valid, or a message may appear indicating that the Boot Block is valid (block 422) and prompting the user to take action to continue with the booting process.

Further, the BIOS may be used to validate other portions of memory, such as the CMOS or additional areas in the NVRAM. To validate the CMOS, a CMOS signature ($CMOS_{SIG}$) representing the encrypted CMOS hash may be stored within the BIOS or CMOS, indicating a valid CMOS fingerprint (block 424). Next, the BIOS reads the CMOS and calculates a CMOS hash ($CMOS_H$) using the hash algorithm which is stored in the BIOS (block 402), as indicated by block 426. The BIOS then uses the Public Key ($K_{PUB}$) stored in the BIOS (block 400) to decrypt the CMOS signature (block 428). The values of the CMOS hash ($CMOS_H$) and the decrypted CMOS signature ($CMOS_{DSIG}$) may then be compared by using a checksum or CRC program (block 430), for example. If the values do not match, the current CMOS is invalid. If the CMOS is not valid, the system may be configured to take one or more actions, such as preventing the system from booting (block 432), producing an error message to a user indicating that the CMOS is not valid (block 434), and/or disabling a portion of the system (block 436), for example. If, on the other hand, the CMOS hash ($CMOS_H$) and the decrypted CMOS signature ($CMOS_{DSIG}$) do match, the CMOS is valid. If the CMOS is valid, the system may be configured to take one or more actions. For instance, the system may be configured such that the system automatically boots (block 438) if the CMOS is valid, or a message may appear indicating that the CMOS is valid (block 440) and prompting the user to take action to continue with the booting process.

To validate the NVRAM, a NVRAM signature ($NVRAM_{SIG}$) representing the encrypted NVRAM hash may be stored within the BIOS or NVRAM, indicating a valid NVRAM fingerprint (block 442). Next, the BIOS reads the NVRAM and calculates a NVRAM hash ($NVRAM_H$) using the hash algorithm which is stored in the BIOS (block 402), as indicated by block 444. The BIOS then uses the Public Key ($K_{PUB}$) stored in the BIOS (block 400) to decrypt the NVRAM signature (block 446). The values of the NVRAM hash ($NVRAM_H$) and the decrypted NVRAM signature ($NVRAM_{DSIG}$) may then be compared by using a checksum or CRC program (block 448), for example. If the values do not match, the current NVRAM is invalid. If the NVRAM is not valid, the system may be configured to take one or more actions, such as preventing the system from booting (block 450), producing an error message to a user indicating that the NVRAM is not valid (block 452), and/or disabling a portion of the system (block 454), for example. If, on the other hand, the NVRAM hash ($NVRAM_H$) and the decrypted NVRAM signature ($NVRAM_{DSIG}$) match, the NVRAM is valid. If the NVRAM is valid, the system may be configured to take one or more actions. For instance, the system may be configured such that the system automatically boots (block 456) if the NVRAM is valid, or a message may appear indicating that the NVRAM is valid (block 458) and prompting the user to take action to continue with the booting process.

For clarity, FIGS. 4 and 5 were discussed independently. However, it should be evident that an alternate embodiment combining both techniques may be used, such that the Boot Block is used to validate the BIOS using an encryption algorithm and the BIOS is then used to validate the Boot Block using an encryption algorithm. Indeed, this particular combination may provide the best security for the computer system.

Figure 6A:
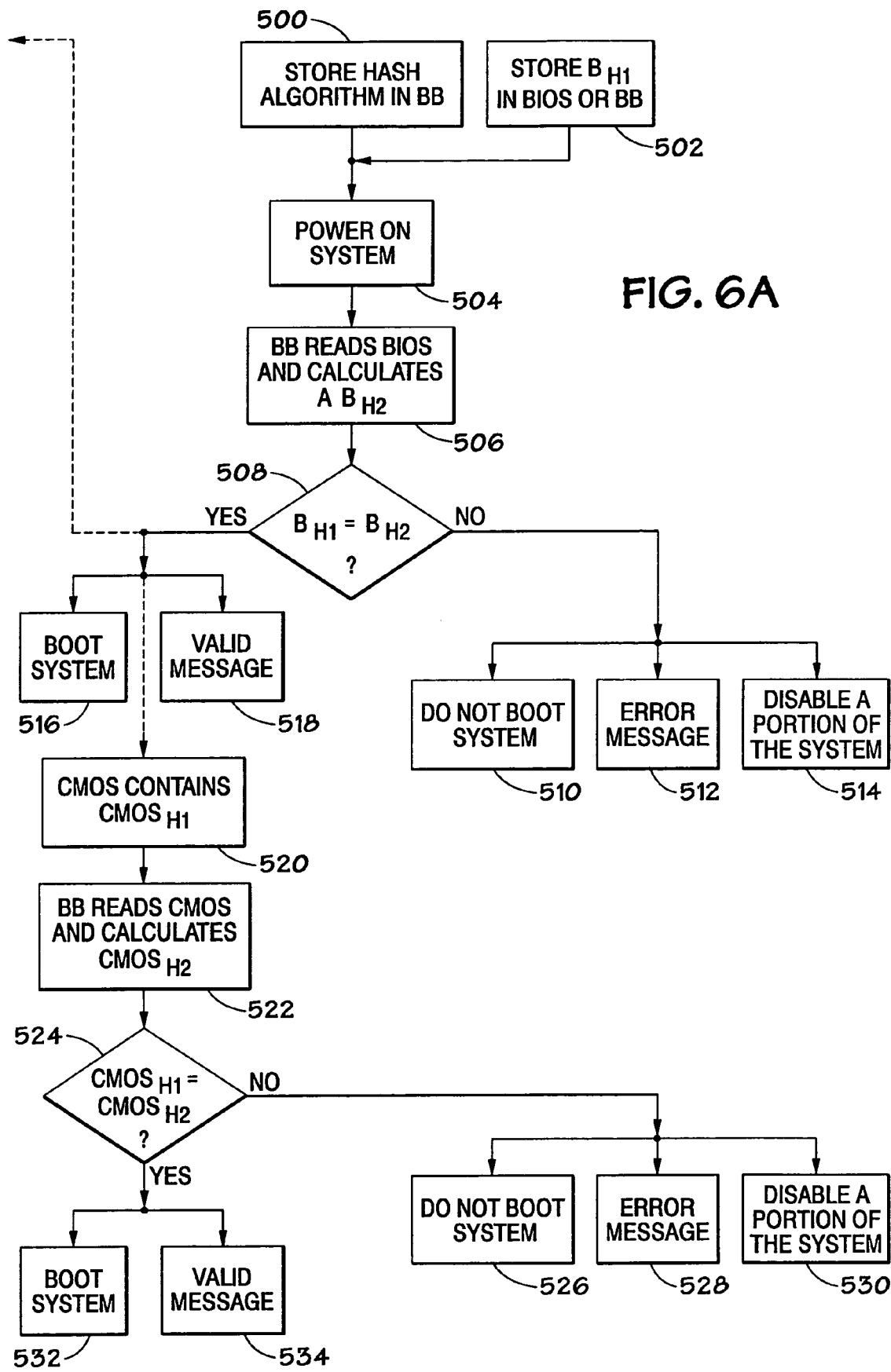
FIG. 6 illustrates a flow chart wherein a Boot Block is used to validate a BIOS and the BIOS is used to validate the Boot Block in accordance with the present invention.
Figure 6B:
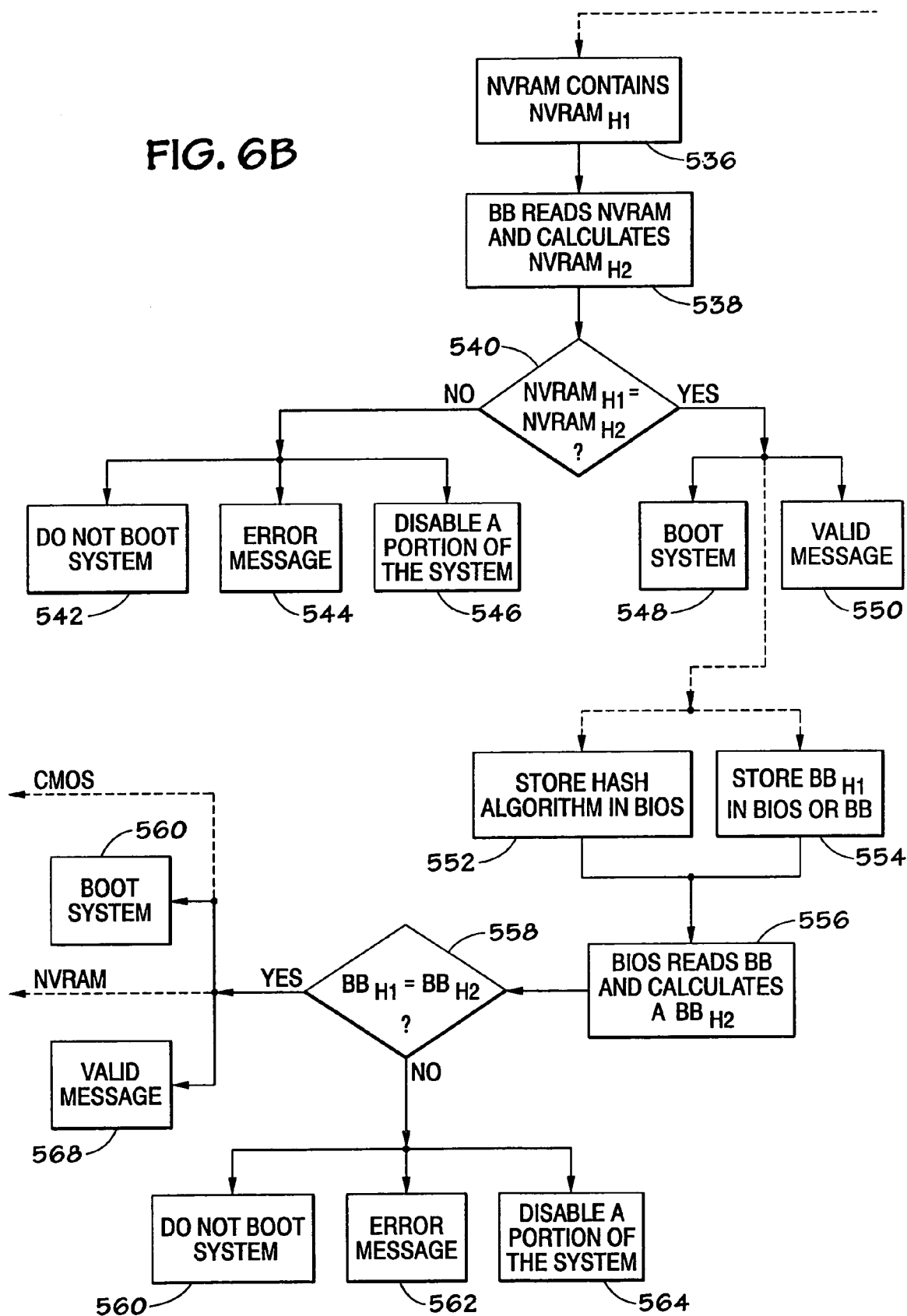
Figure 6C:
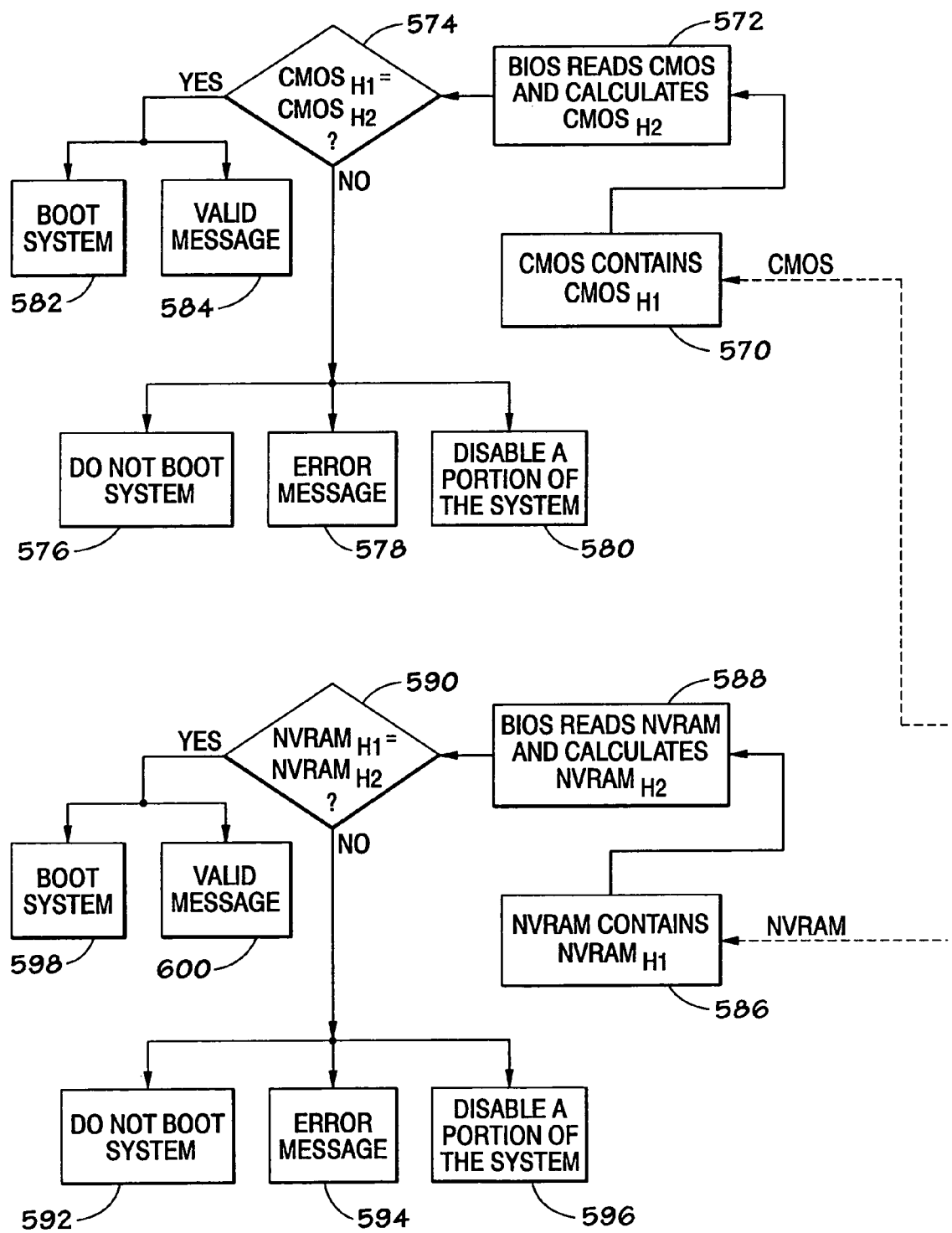

FIG. 6 illustrates a flow chart describing yet another embodiment wherein the Boot Block is used to validate the BIOS and the BIOS is used to validate the Boot Block, without encrypting the hash values of each memory component. Again, FIG. 7 illustrates a table of symbols and should be used in conjunction with the discussion of FIG. 6.

Initially, a hash algorithm is stored in the Boot Block (block 500). A BIOS hash value equal to the value that should be present in the system ($B_{H1}$) is also stored in the Boot Block or the BIOS (block 502). Each time the system is powered on (block 504) the validation routine is implemented. First, the Boot Block reads the BIOS and calculates the current BIOS hash value ($B_{H2}$) (block 506). If the BIOS is valid, the stored BIOS hash value ($B_{H1}$) is equal the current BIOS hash value ($B_{H2}$). A comparison between $B_{H1}$ and $B_{H2}$ is made (block 508), using a checksum algorithm or CRC program. If the values do not match, this indicates that the current BIOS is invalid. If the BIOS is not valid, the system may be configured to take one or more actions, such as preventing the system from booting (block 510), producing an error message to a user indicating that the BIOS is not valid (block 512), and/or disabling a portion of the system (block 514), for example. If, on the other hand, the stored BIOS hash ($B_{H1}$) and the current BIOS hash value ($B_{H2}$) match, the BIOS is valid. If the BIOS is valid, the system may be configured to take one or more actions. For instance, the system may be configured such that the system automatically boots (block 516) if the BIOS is valid, or a message may appear indicating that the BIOS is valid (block 518) and prompting the user to take action to continue with the booting process.

Further, the Boot Block may be used to validate other portions of memory, such as the CMOS or additional areas in the NVRAM, without using encryption. To validate the CMOS, a CMOS hash value representing the value that should be present in the system ($CMOS_{H1}$) is stored in the Boot Block or CMOS (block 520). Next, the Boot Block reads the CMOS and calculates the current CMOS hash ($CMOS_{H2}$) using the hash algorithm which is stored in the Boot Block (block 500), as indicated by block 522. The values of the stored CMOS hash ($CMOS_{H1}$) and the current CMOS hash ($CMOS_{H2}$) are then compared using a checksum or CRC program (block 524), for example. If the values do not match, the current CMOS is invalid. If the CMOS is not valid, the system may be configured to take one or more actions, such as preventing the system from booting (block 526), producing an error message to a user indicating that the CMOS is not valid (block 528), and/or disabling a portion of the system (block 530), for example. If, on the other hand, the stored CMOS hash ($CMOS_{H1}$) and the current CMOS hash ($CMOS_{H2}$) match, the CMOS is valid. If the CMOS is valid, the system may be configured to take one or more actions. For instance, the system may be configured such that the system automatically boots (block 532) if the CMOS is valid, or a message may appear indicating that the CMOS is valid (block 534) and prompting the user to take action to continue with the booting process.

To validate the NVRAM, an NVRAM hash value equal to the value that should be present in the system ($NVRAM_{H1}$) is stored in the Boot Block or NVRAM (block 536). Next, the Boot Block reads the NVRAM and calculates a current NVRAM hash ($NVRAM_{H2}$) using the hash algorithm which is stored in the Boot Block (block 500), as indicated by block 538. The values of the stored NVRAM hash ($NVRAM_{H1}$) and the current NVRAM hash ($NVRAM_{H2}$) may then be compared by using a checksum or CRC program (block 540), for example. If the values do not match, the current NVRAM is invalid. If the NVRAM is not valid, the system may be configured to take one or more actions, such as preventing the system from booting (block 542), producing an error message to a user indicating that the NVRAM is not valid (block 544), and/or disabling a portion of the system (block 546), for example. If, on the other hand, the stored NVRAM hash (NVRAM$_{H1}$) and the current NVRAM hash (NVRAM$_{H2}$) match, the NVRAM is valid. If the NVRAM is valid, the system may be configured to take one or more actions. For instance, the system may be configured such that the system automatically boots (block 548) if the NVRAM is valid, or a message may appear indicating that the NVRAM is valid (block 550) and prompting the user to take action to continue with the booting process.

Additionally, the present embodiment described in FIG. 6 further illustrates a flow chart wherein the BIOS is used to validate the Boot Block without using encryption. For illustrative purposes, this process is described in conjunction with the Boot Block validating the BIOS without using encryption. However, it should be evident that the BIOS may be used to validate the Boot Block without having the Boot Block validate the BIOS.

Initially, a hash algorithm is stored in the BIOS (block 552). A Boot Block hash value equal to the value that should be present in the system (BB$_{H1}$) is also stored in the Boot Block or the BIOS (block 554). First, the BIOS reads the Boot Block and calculates the current Boot Block hash value (BB$_{H2}$) (block 556). If the Boot Block is valid, the stored Boot Block hash value (BB$_{H1}$) is equal to the current Boot Block hash value (BB$_{H2}$). The values of the stored Boot Block hash (BB$_{H1}$) and the current Boot Block hash (BB$_{H2}$) are then compared using a checksum algorithm or CRC program (block 558), for example. If the values do not match, the current Boot Block is invalid. If the Boot Block is not valid, the system may be configured to take one or more actions, such as preventing the system from booting (block 560), producing an error message to a user indicating that the Boot Block is not valid (block 562), and/or disabling a portion of the system (block 564), for example. If, on the other hand, the stored Boot Block hash (BB$_{H1}$) and the current Boot Block hash values (BB$_{H2}$) match, the Boot Block is valid. If the Boot Block is valid, the system may be configured to take one or more actions. For instance, the system may be configured such that the system automatically boots (block 566) if the Boot Block is valid, or a message may appear indicating that the Boot Block is valid (block 568) and prompting the user to take action to continue with the booting process.

Further, the BIOS may be used to validate other portions of memory, such as the CMOS or additional areas in the NVRAM. To validate the CMOS, a CMOS hash value representing the value that should be in the present system (CMOS$_{H1}$) is stored in the BIOS or CMOS (block 570). Next, the BIOS reads the CMOS and calculates the current CMOS hash (CMOS$_{H2}$) using the hash algorithm which is stored in the BIOS (block 552), as indicated by block 572. The values of the stored CMOS hash (CMOS$_{H1}$) and the current CMOS hash (CMOS$_{H2}$) are then compared using a checksum or CRC program (block 574), for example. If the values do not match, the current CMOS is invalid. If the CMOS is not valid, the system may be configured to take one or more actions, such as preventing the system from booting (block 576), producing an error message to a user indicating that the CMOS is not valid (block 578), and/or disabling a portion of the system (block 580), for example. If, on the other hand, the stored CMOS hash (CMOS$_{H1}$) and the current CMOS hash values (CMOS$_{H2}$) match, the CMOS is valid. If the CMOS is valid, the system may be configured to take one or more actions. For instance, the system may be configured such that the system automatically boots (block 582) if the CMOS is valid, or a message may appear indicating that the CMOS is valid (block 584) and prompting the user to take action to continue with the booting process.

To validate the NVRAM, an NVRAM hash value equal to the value that should be present in the system (NVRAM$_{H1}$) is stored in the BIOS or NVRAM (block 586). Next, the BIOS reads the NVRAM and calculates a current NVRAM hash (NVRAM$_{H2}$) using the hash algorithm which is stored in the BIOS (block 552), as indicated by block 588. The values of the stored NVRAM hash (NVRAM$_{H1}$) and the current NVRAM hash (NVRAM$_{H2}$) are then compared by using a checksum or CRC program (block 590). If the values do not match, the current NVRAM is invalid. If the NVRAM is not valid, the system may be configured to take one or more actions, such as preventing the system from booting (block 592), producing an error message to a user indicating that the NVRAM is not valid (block 594), and/or disabling a portion of the system (block 596), for example. If, on the other hand, the stored NVRAM hash (NVRAM$_{H1}$) and the current NVRAM hash (NVRAM$_{H2}$) match, the NVRAM is valid. If the NVRAM is valid, the system may be configured to take one or more actions. For instance, the system may be configured such that the system automatically boots (block 598) if the NVRAM is valid, or a message may appear indicating that the NVRAM is valid (block 600) and prompting the user to take action to continue with the booting process.

In the embodiments described above, it should also be noted that the computer system may take certain other actions instead of, or in addition to, the actions discussed above if any portion of the system, such as the Boot Block, BIOS, CMOS memory, and/or NVRAM, etc., is not initially validated. For example, the computer system may perform self-correcting, reset, and/or default procedures. As to one possible method of self-correcting, it should be remembered that the flash memory may be segmented into two portions, wherein each portion stores a copy of the BIOS. Thus, if the BIOS in the first portion of the flash memory is invalid, the system can automatically, or by user selection, attempt to validate the BIOS stored in the second portion of the flash memory. If the BIOS stored in the second portion of the flash memory is valid, the computer system may continue to operate using that copy of the BIOS until the BIOS in the first portion of the flash memory is corrected. If the BIOS in both portions of the flash memory is invalid, the system may attempt to reset itself by asking a user to reload a valid BIOS, from a floppy disk for instance. The system may also exhibit a default behavior in which it relies on default values or default code so that the computer system can perform at least certain basic or safe mode operations.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A computer system comprising:
 a first section of non-volatile memory configured to store a BIOS program, the first section of non-volatile memory being reprogrammable; and a second section of non-volatile memory operatively coupled to the first section of non-volatile memory, the second section of non-volatile memory being configured to store a boot-block program;

the boot-block program having a first validation routine configured to validate the BIOS program stored in the first section of non-volatile memory, and the BIOS program having a second validation routine configured to validate the boot-block program stored in the second section of non-volatile memory.

2. The system, as set forth in claim 1, wherein the first section of non-volatile memory comprises a protected segment of a reprogrammable memory device.

3. The system, as set forth in claim 2, wherein the second section of non-volatile memory comprises a reprogrammable segment of the reprogrammable memory device.

4. The system, as set forth in claim 3, wherein the reprogrammable memory device comprises a flash memory comprising the protected segment and the reprogrammable segment.

5. The system, as set forth in claim 1, wherein the first section of non-volatile memory comprises a first memory device.

6. The system, as set forth in claim 5, wherein the second section of non-volatile memory comprises a second memory device.

7. The system, as set forth in claim 1, wherein the boot-block program comprises a public key and a hash algorithm used to validate the BIOS program.

8. The system, as set forth in claim 7, wherein one of the boot-block program and the BIOS program comprises an encrypted hash correlative to the BIOS program.

9. The system, as set forth in claim 8, wherein the encrypted hash is encrypted using a private key correlative to the public key.

10. The system, as set forth in claim 9, wherein the boot-block program validates the BIOS program by calculating a first hash of the BIOS program using the hash algorithm, using the public key to decrypt the encrypted hash to produce a second hash, and comparing the first hash to the second hash.

11. The system, as set forth in claim 10, wherein the boot-block program does not allow the system to boot if the first hash does not match the second hash, and wherein the boot-block program does allow the system to boot if the first hash matches the second hash.

12. The system, as set forth in claim 10, wherein the system warns a user if the first hash does not match the second hash.

13. The system, as set forth in claim 12, wherein the boot-block program allows the system to boot if the first hash does not match the second hash.

14. The system, as set forth in claim 12, wherein the boot-block program allows the system to boot if the first hash does not match the second hash in response to an instruction to boot from the user.

15. The system, as set forth in claim 10, wherein various system resources are enabled or disabled depending upon whether the first hash matches the second hash.

16. The system, as set forth in claim 1, wherein the BIOS program comprises a public key and a hash algorithm used to validate the boot-block program.

17. The system, as set forth in claim 16, wherein one of the boot-block program and the BIOS program comprises an encrypted hash correlative to the boot-block program.

18. The system, as set forth in claim 17, wherein the encrypted hash is encrypted using a private key correlative to the public key.

19. The system, as set forth in claim 18, wherein the BIOS program validates the boot-block program by calculating a first hash of the boot-block program using the hash algorithm, using the public key to decrypt the encrypted hash to produce a second hash, and comparing the first hash to the second hash.

20. The system, as set forth in claim 19, wherein the BIOS program does not allow the system to boot if the first hash does not match the second hash, and wherein the BIOS program does allow the system to boot if the first hash matches the second hash.

21. The system, as set forth in claim 19, wherein the system warns a user if the first hash does not match the second hash.

22. The system, as set forth in claim 21, wherein the BIOS program allows the system to boot if the first hash does not match the second hash.

23. The system, as set forth in claim 21, wherein the BIOS program allows the system to boot if the first hash does not match the second hash in response to an instruction to boot from the user.

24. The system, as set forth in claim 19, wherein various system resources are enabled or disabled depending upon whether the first hash matches the second hash.

25. The system, as set forth in claim 1, comprising:
CMOS memory operatively coupled to at least one of the first section of non-volatile memory and the second section of non-volatile memory; and
non-volatile random access memory (NVRAM) operatively coupled to at least one of the first section of non-volatile memory and the second section of non-volatile memory.

26. The system, as set forth in claim 25, wherein the first validation routine is configured to validate at least one of the CMOS memory and the NVRAM.

27. The system, as set forth in claim 25, wherein the second validation routine is configured to validate at least one of the CMOS memory and the NVRAM.

28. The system, as set forth in claim 1, comprising a processing system operatively coupled to the first section of non-volatile memory and to the second section of non-volatile memory.

29. A computer system comprising:
means for validating a BIOS program stored in a first section of non-volatile memory by a boot-block program stored in a second section of non-volatile memory; and
means for validating the boot-block program stored in the second section of non-volatile memory by the BIOS program stored in the first section of non-volatile memory.

30. The system, as set forth in claim 29, wherein the means for validating the BIOS program comprises:
means for storing a public key and a hash algorithm used to validate the BIOS program;
means for storing an encrypted hash correlative to the BIOS program;
means for calculating a first hash of the BIOS program using the hash algorithm;
means for decrypting the encrypted hash using the public key to produce a second hash; and
means for comparing the first hash to the second hash.

31. The system, as set forth in claim 30, wherein the means for validating the BIOS program comprises:

means for booting the system if the first hash matches the second hash; and means for not booting the system if the first hash does not match the second hash.

32. The system, as set forth in claim 30, wherein the means for validating the BIOS program comprises:

means for warning a user if the first hash does not match the second hash.

33. The system, as set forth in claim 32, wherein the means for validating the BIOS program comprises:

means for booting the system if the first hash does not match the second hash.

34. The system, as set forth in claim 32, wherein the means for validating the BIOS program comprises:

means for booting the system if the first hash does not match the second hash in response to an instruction to boot from the user.

35. The system, as set forth in claim 30, wherein the means for validating the BIOS program comprises:

means for enabling or disabling resources in dependence upon whether the first hash matches the second hash.

36. The system, as set forth in claim 29, wherein the means for validating the boot-block program comprises:

means for storing a public key and a hash algorithm used to validate the boot-block program;

means for storing an encrypted hash correlative to the boot-block program;

means for calculating a first hash of the boot-block program using the hash algorithm;

means for decrypting the encrypted hash using the public key to produce a second hash; and means for comparing the first hash to the second hash.

37. The system, as set forth in claim 36, wherein the means for validating the boot-block program comprises:

means for booting the system if the first hash matches the second hash; and means for not booting the system if the first hash does not match the second hash.

38. The system, as set forth in claim 36, wherein the means for validating the boot-block program comprises:

means for warning a user if the first hash does not match the second hash.

39. The system, as set forth in claim 38, wherein the means for validating the boot-block program comprises:

means for booting the system if the first hash does not match the second hash.

40. The system, as set forth in claim 38, wherein the means for validating the boot-block program comprises:

means for booting the system if the first hash does not match the second hash in response to an instruction to boot from the user.

41. The system, as set forth in claim 36, wherein the means for validating the boot-block program comprises:

means for enabling or disabling resources in dependence upon whether the first hash matches the second hash.

42. A method of operating a computer system comprising:

validating a BIOS program stored in a first section of non-volatile memory by a boot-block program stored in a second section; and validating the boot-block program stored in the second section of non-volatile memory by the BIOS program stored in the first section.

43. The method, as set forth in claim 42, wherein the act of validating the BIOS program comprises:

storing a public key and a hash algorithm used to validate the BIOS program;

storing an encrypted hash correlative to the BIOS program;

calculating a first hash of the BIOS program using the hash algorithm;

decrypting the encrypted hash using the public key to produce a second hash; and comparing the first hash to the second hash.

44. The method, as set forth in claim 43, wherein the act of validating the BIOS program comprises:

booting the system if the first hash matches the second hash; and preventing the system from booting if the first hash does not match the second hash.

45. The method, as set forth in claim 43, wherein the act of validating the BIOS program comprises:

warning a user if the first hash does not match the second hash.

46. The method, as set forth in claim 45, wherein the act of validating the BIOS program comprises:

booting the system if the first hash does not match the second hash.

47. The method, as set forth in claim 45, wherein the act of validating the BIOS program comprises:

booting the system if the first hash does not match the second hash in response to an instruction to boot from the user.

48. The method, as set forth in claim 43, wherein the act of validating the BIOS program comprises:

enabling or disabling resources in dependence upon whether the first hash matches the second hash.

49. The method, as set forth in claim 42, wherein the act of validating the boot-block program comprises:

storing a public key and a hash algorithm used to validate the boot-block program;

storing an encrypted hash correlative to the boot-block program;

calculating a first hash of the boot-block program using the hash algorithm;

decrypting the encrypted hash using the public key to produce a second hash; and comparing the first hash to the second hash.

50. The method, as set forth in claim 49, wherein the act of validating the boot-block program comprises:

booting the system if the first hash matches the second hash; and preventing the system from booting if the first hash does not match the second hash.

51. The method, as set forth in claim 49, wherein the act of validating the boot-block program comprises:

warning a user if the first hash does not match the second hash.

52. The method, as set forth in claim 51, wherein the act of validating the boot-block program comprises:

booting the system if the first hash does not match the second hash.

53. The method, as set forth in claim 51, wherein the act of validating the boot-block program comprises:

booting the system if the first hash does not match the second hash in response to an instruction to boot from the user.

54. The method, as set forth in claim 49, wherein the act of validating the boot-block program comprises:

enabling or disabling resources in dependence upon whether the first hash matches the second hash.

55. The method, as set forth in claim 43, wherein the act of validating the BIOS program comprises:

performing at least one of a self-correcting, reset, and default function if the first hash does not match the second hash.

* * * * *